(12) United States Patent
Song et al.

(10) Patent No.: US 8,780,596 B2
(45) Date of Patent: Jul. 15, 2014

(54) VOLTAGE ADJUSTING CIRCUIT, CONTACTLESS CARD AND CONTACTLESS CARD SYSTEM HAVING THE SAME, AND METHODS OF OPERATING THE VOLTAGE ADJUSTING CIRCUIT AND THE CONTACTLESS CARD

(75) Inventors: Il Jong Song, Yongin-si (KR); Hang Seok Choi, Suwon-si (KR); Sang Hyo Lee, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 277 days.

(21) Appl. No.: 13/435,286

(22) Filed: Mar. 30, 2012

(65) Prior Publication Data

US 2012/0250383 A1  Oct. 4, 2012

(30) Foreign Application Priority Data

Apr. 1, 2011  (KR) .................. 10-2011-0030373

(51) Int. Cl.
*H02M 7/217*  (2006.01)

(52) U.S. Cl.
USPC .............................. 363/125; 363/84; 327/534

(58) Field of Classification Search
CPC ............................ H02M 7/155; H02M 7/217
USPC ....................... 327/534; 363/81, 84, 125–127
See application file for complete search history.

(56) References Cited

U.S. PATENT DOCUMENTS

| 6,134,130 | A  | * | 10/2000 | Connell et al. ............... 363/89 |
| 2005/0205679 | A1 | * | 9/2005 | Alihodzic ................... 235/492 |
| 2008/0094180 | A1 | | 4/2008 | Kato et al. |
| 2008/0247208 | A1 | | 10/2008 | Fujita et al. |

FOREIGN PATENT DOCUMENTS

| JP | 2005-197890 | 7/2005 |
| JP | 2008-123502 | 5/2008 |
| JP | 2008-277804 | 11/2008 |
| KR | 1020080035455 | 4/2008 |
| KR | 1020080090288 | 10/2008 |

* cited by examiner

*Primary Examiner* — Harry Behm
*Assistant Examiner* — Matthew Grubb
(74) *Attorney, Agent, or Firm* — Stanzione & Kim, LLP

(57) ABSTRACT

A voltage adjusting circuit is provided includes an inducing circuit configured to induce a voltage from electromagnetic waves, a first rectifying circuit configured to rectify an output voltage of the inducing circuit, a control circuit configured to control an output voltage of the first rectifying circuit in response to the output voltage of the first rectifying circuit, and a second rectifying circuit configured to simultaneously rectify and regulate the output voltage of the inducing circuit in response to the output voltage of the first rectifying circuit.

16 Claims, 12 Drawing Sheets

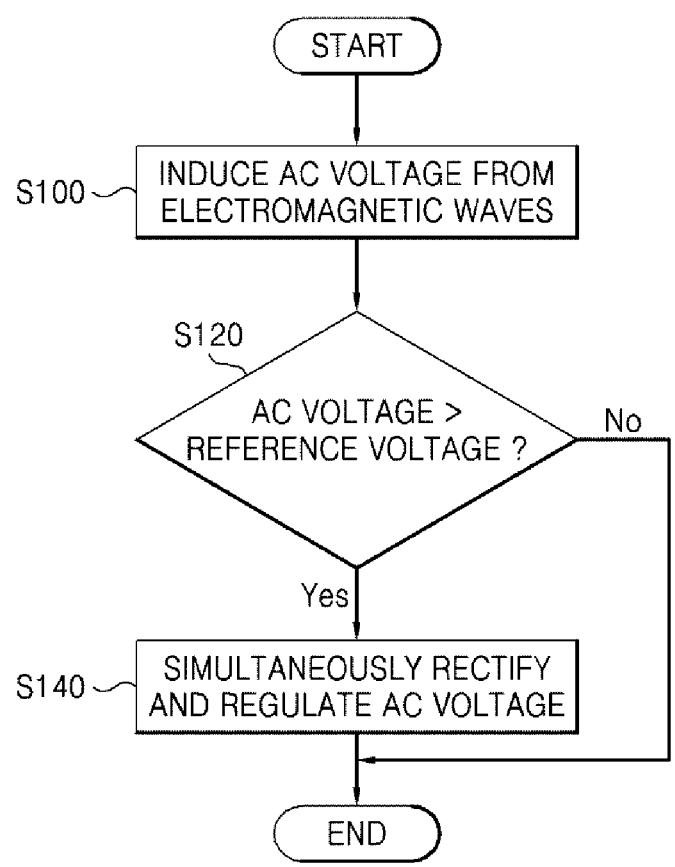

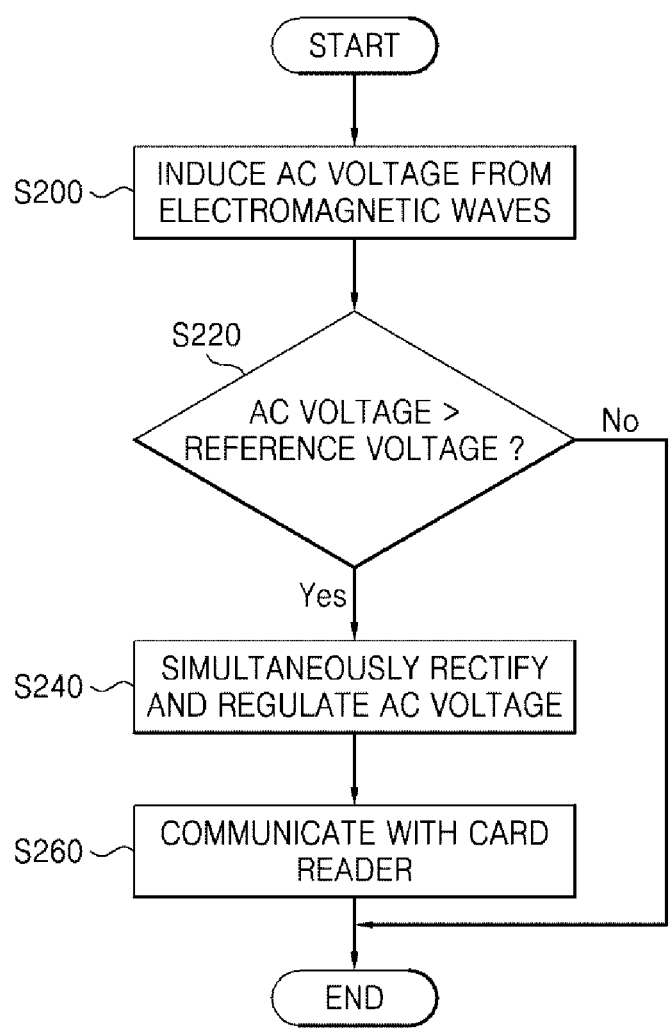

VOLTAGE ADJUSTING CIRCUIT, CONTACTLESS CARD AND CONTACTLESS CARD SYSTEM HAVING THE SAME, AND METHODS OF OPERATING THE VOLTAGE ADJUSTING CIRCUIT AND THE CONTACTLESS CARD

CROSS-REFERENCE TO RELATED APPLICATIONS

This application claims priority under 35 U.S.C. §119 from Korean Patent Application No 10-2011-0030373, filed on Apr. 1, 2011, in the Korean Intellectual Property Office, the disclosure of which is incorporated by reference herein in its entirety.

BACKGROUND

1. Field of the Invention

Embodiments relates to voltage adjusting technology, and more particularly, to a voltage adjusting circuit to generate constant power in an external environment such as a distance between a card reader and a contactless card, a contactless card and a contactless card system which include the same, and methods of operating the voltage adjusting circuit and the contactless card.

2. Description of the Related Art

Contactless card systems, for example, smart card systems, use contactless information detection technology in which a card reader detects a smart card, which is disposed away from the card reader by a distance, and transmits and receives information to and from the smart card using a radio frequency.

A contactless card is supplied with power by inducing voltage from electromagnetic waves emitted by a card reader. Accordingly, the power induced in the contactless card changes depending on a distance between the contactless card and the card reader or the like. When the power exceeding what is needed for driving the contactless card is induced in the contactless card, an internal logic circuit in the contactless card may malfunction or break down due to the excessive power.

To overcome this problem, constant power needs to be supplied to the internal logic circuit regardless of external environments.

SUMMARY OF THE INVENTION

Some embodiments of the present general inventive concept provide a voltage adjusting circuit to supply constant power to an internal logic circuit regardless of an external environment, a contactless card and a contactless card system which include the same, and methods of rectifying and regulating induced voltage using the voltage adjusting circuit.

Additional aspects and advantages of the present general inventive concept will be set forth in part in the description which follows and, in part, will be obvious from the description, or may be learned by practice of the general inventive concept.

The foregoing and/or other features and utilities of the present general inventive concept may be achieved by providing a voltage adjusting circuit including an inducing circuit configured to induce a voltage from electromagnetic waves, a first rectifying circuit configured to rectify an output voltage of the inducing circuit, a control circuit configured to control an output voltage of the first rectifying circuit in response to the output voltage of the first rectifying circuit, and a second rectifying circuit configured to simultaneously rectify and regulate the output voltage of the inducing circuit in response to the output voltage of the first rectifying circuit. The second rectifying circuit may include a plurality of diode-connected P-type metal oxide semiconductor (PMOS) transistors connected in series with each other. A bulk of each of the PMOS transistors may be connected with an output terminal of the first rectifying circuit.

The control circuit may include at least one diode connected in series between the output terminal of the first rectifying circuit and a ground. As an alternative, the control circuit may include a diode backward connected between the output terminal of the first rectifying circuit and the ground. Alternatively, the control circuit may include a comparator configured to compare the output voltage of the first rectifying circuit with a reference voltage and a switching circuit configured to control the output voltage of the first rectifying circuit in response to an output signal of the comparator.

The control circuit may further include a voltage divider connected between the output terminal of the first rectifying circuit and an input terminal of the comparator. The switching circuit may be a MOS transistor functioning as a shunt.

The control circuit may further include a first capacitor connected between an output terminal of the comparator and the ground. The voltage adjusting circuit may further include a second capacitor connected between the output terminal of the first rectifying circuit and the ground and a third capacitor connected between an output terminal of the second rectifying circuit and the ground. The voltage adjusting circuit may further include a regulator configured to regulate an output signal of the second rectifying circuit.

The foregoing and/or other features and utilities of the present general inventive concept may also be achieved by providing a method of operating a voltage adjusting circuit. The method includes the operations of inducing an alternating current (AC) voltage from electromagnetic waves using an inducing circuit; and simultaneously rectifying and regulating the AC voltage using a diode-connected PMOS transistor when the AC voltage is higher than a reference voltage.

The simultaneously rectifying and regulating the AC voltage may include regulating the AC voltage by flowing a current generated by an excessive portion of the AC voltage exceeding the reference voltage to a bulk of the diode-connected PMOS transistor.

Alternatively, the simultaneously rectifying and regulating the AC voltage may include rectifying the AC voltage using a rectifying circuit, decreasing an output voltage of the rectifying circuit by forming a current path from an output terminal of the rectifying circuit to a ground using a control circuit, and providing a decreased output voltage to a bulk of the diode-connected PMOS transistor.

The decreasing the output voltage of the rectifying circuit may include forming the current path when the output voltage of the rectifying circuit exceeds a threshold voltage of at least one diode connected in series between the output terminal of the rectifying circuit and the ground. As an alternative, the decreasing the output voltage of the rectifying circuit may include forming the current path when the output voltage of the rectifying circuit exceeds a breakdown voltage of a diode backward connected between the output terminal of the rectifying circuit and the ground.

Alternatively, the decreasing the output voltage of the rectifying circuit may include comparing the output voltage of the rectifying circuit with a reference voltage and outputting a comparison signal, and forming the current path from the output terminal of the rectifying circuit to the ground in response to the comparison signal when the output voltage of the rectifying circuit exceeds the reference voltage. The method may further include regulating an output voltage of the diode-connected PMOS transistor using a regulator and providing a regulated output voltage to a logic circuit.

The foregoing and/or other features and utilities of the present general inventive concept may also be achieved by providing a contactless card including the above-described voltage adjusting circuit and a logic circuit configured to receive a direct current (DC) voltage from the voltage adjusting circuit and process data received or transmitted through the inducing circuit. The second rectifying circuit may include a plurality of diode-connected PMOS transistors connected in series with each other. A bulk of each of the PMOS transistors may be connected with an output terminal of the first rectifying circuit.

The control circuit may include at least one diode connected in series between the output terminal of the first rectifying circuit and a ground. As an alternative, the control circuit may include a diode backward connected between the output terminal of the first rectifying circuit and the ground. Alternatively, the control circuit may include a comparator configured to compare the output voltage of the first rectifying circuit with a reference voltage and a switching circuit configured to control the output voltage of the first rectifying circuit in response to an output signal of the comparator. The switching circuit may be a MOS transistor functioning as a shunt.

The foregoing and/or other features and utilities of the present general inventive concept may also be achieved by providing a contactless card system includes the above-described contactless card and a card reader configured to supply power to the contactless card using a radio system and communicate with the contactless card. The second rectifying circuit may include a plurality of diode-connected PMOS transistors connected in series with each other. A bulk of each of the PMOS transistors may be connected with an output terminal of the first rectifying circuit.

The control circuit may include at least one diode connected in series between the output terminal of the first rectifying circuit and a ground. As an alternative, the control circuit may include a diode backward connected between the output terminal of the first rectifying circuit and the ground. Alternatively, the control circuit may include a comparator configured to compare the output voltage of the first rectifying circuit with a reference voltage and a switching circuit configured to control the output voltage of the first rectifying circuit in response to an output signal of the comparator. The switching circuit may be a MOS transistor functioning as a shunt.

The foregoing and/or other features and utilities of the present general inventive concept may also be achieved by providing a method of operating a contactless card includes the operations of inducing an AC voltage from electromagnetic waves using an inducing circuit, outputting a DC voltage by simultaneously rectifying and regulating the AC voltage using a diode-connected PMOS transistor when the AC voltage is higher than a reference voltage, and communicating with a card reader using the DC voltage as a driving voltage.

The operation of outputting the DC voltage may include regulating the AC voltage by flowing a current generated by an excessive portion of the AC voltage exceeding the reference voltage to a bulk of the diode-connected PMOS transistor. Alternatively, the operation of outputting the DC voltage may include rectifying the AC voltage using a rectifying circuit; decreasing an output voltage of the rectifying circuit by forming a current path from an output terminal of the rectifying circuit to a ground using a control circuit; and providing a decreased output voltage to a bulk of the diode-connected PMOS transistor.

The foregoing and/or other features and utilities of the present general inventive concept may also be achieved by providing a voltage adjusting circuit usable with a contactless card, the voltage adjusting circuit including an inducing circuit configured to receive a radio signal, and having one or more terminals to output a first voltage signal according to the received radio signal, a circuit unit connected to the terminals of the inducing circuit to rectify and control the voltage signal of the inducing circuit, and having another terminal to generate a second voltage signal, and a second circuit unit connected to the terminals of the inducing circuit to receive the first voltage signal and connected to the another terminal to receive the second voltage signals, and to rectify and regulate the first voltage signal according to the second voltage signal to generate a third voltage signal.

The contactless card may include a logic circuit connected to the second circuit unit to receive the third voltage signal.

The first voltage signal may be variable, the second voltage signal may also be variable, and the third voltage signal may be constant.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 10 is a flowchart illustrating a method of operating a voltage adjusting circuit according to an exemplary embodiment of the present general inventive concept; and FIG. 11 is a flowchart illustrating a method of operating a contactless card according to an exemplary embodiment of the present general inventive concept.

DETAILED DESCRIPTION OF THE EXEMPLARY EMBODIMENTS

Figure 1:
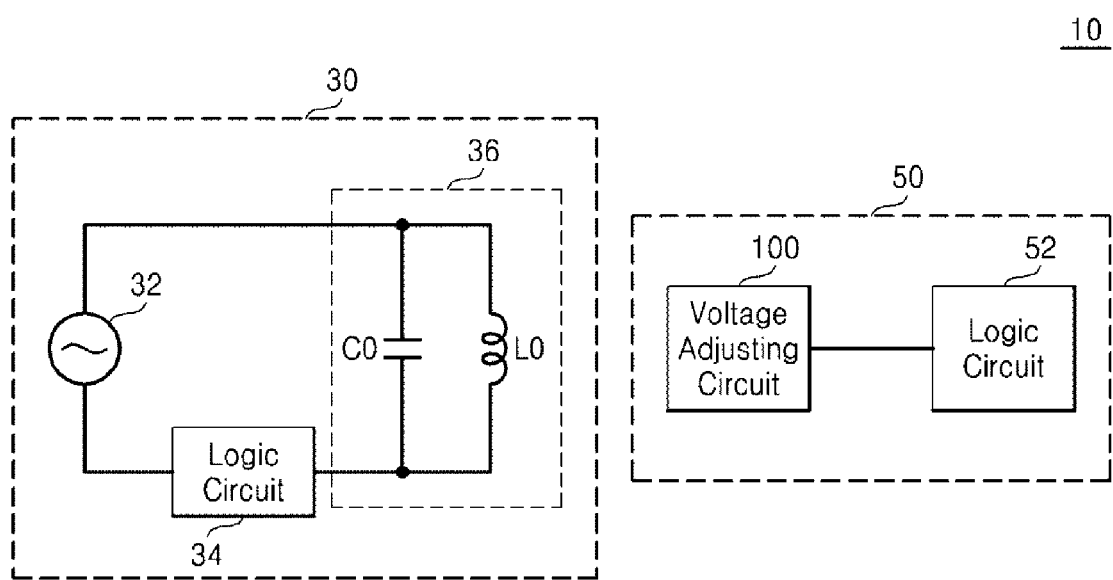
FIG. 1 is a diagram illustrating a contactless card system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

In the drawing figures, the dimensions of regions may be exaggerated for clarity of illustration. It will also be understood when an element is referred to as being "between" two elements, it can be the only element between the two elements, or one or more intervening elements may also be present. Like reference numerals refer to like elements throughout.

FIG. 1 is a diagram illustrating a contactless card system 10 according to an exemplary embodiment of the present general inventive concept. Referring to FIG. 1, the contactless card system 10 includes a card reader 30 and a contactless card 50. The card reader 30 and the contactless card 50 communicate with each other to transmit and receive data using a radio system. The data may be stored in a memory unit of the contactless card 50 as information on the contactless card 50, the card reader 30, a card user, etc. The stored data may be transmitted to the card reader 30. The contactless card 50 may have a power storage unit to store power supplied from the card reader 30. The contactless card 50 may also have a controller to control operations of components of the contactless card 50.

The card reader 30 supplies energy to the contactless card 50 by emitting electromagnetic waves and communicates with the contactless card 50. The contactless card 50 is disposed within a range to receive the electromagnetic waves emitted from the card reader 30. The card reader 30 includes a power supply 32, a logic circuit 34, and a resonant circuit 36.

The power supply 32 supplies operating power to the card reader 30. The power supply 32 may be an alternating current (AC) power supply unit. The power supply 32 may be a DC power supply unit to generate a direct current and/or a converter unit to convert the direct current to an alternating current, so that the operating power is supplied to the card reader 30. The logic circuit 34 processes data to be transmitted to the contactless card 50 and data received from the contactless card 50. The resonant circuit 36 emits energy necessary to drive the contactless card 50 and data to be transmitted to the contactless card 50 in a form of electromagnetic waves. The resonant circuit 36 may also receive electromagnetic waves from the contactless card 50. The resonant circuit 36 may include a capacitor C0 and an inductor L0 which are connected in parallel with each other. The resonant circuit 36 may function as an antenna.

The contactless card 50 receives electromagnetic waves from the card reader 30 and outputs electromagnetic waves to the card reader 30 after processing data. The contactless card 50 includes a voltage adjusting circuit 100 and a logic circuit 52.

The voltage adjusting (or regulating) circuit 100 receives electromagnetic waves from the card reader 30, and rectifies and regulates the electromagnetic waves. The voltage adjusting circuit unit 100 may simultaneously rectify and regulate the electromagnetic waves. The voltage adjusting circuit 100 provides a regulated output voltage to the logic circuit 52. The logic circuit 52 is provided with a direct current (DC) voltage by the voltage adjusting circuit 100 and processes data which has been received or will be transmitted through the voltage adjusting circuit 100.

Figure 2:
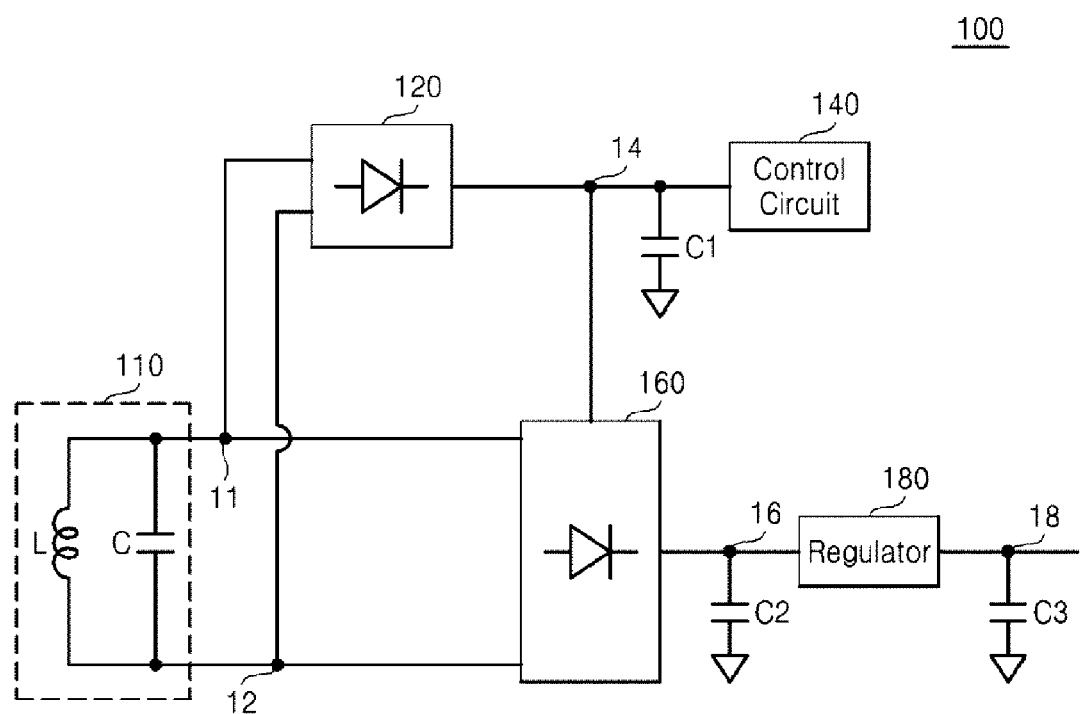
FIG. 2 is a schematic block diagram illustrating a voltage adjusting circuit of the contactless card of FIG. 1 according to an exemplary embodiment of the present general inventive concept.

FIG. 2 is a schematic block diagram illustrating the voltage adjusting circuit 100 of FIG. 1. Referring to FIGS. 1 and 2, the voltage adjusting circuit 100 includes an inducing circuit 110, a first rectifying circuit 120, a control circuit 140, and a second rectifying circuit 160.

The inducing circuit 110 may receive electromagnetic waves from the card reader 30 or emit electromagnetic waves to the card reader 30. The inducing circuit 110 may induce an AC voltage from the electromagnetic waves received from the card reader 30. The inducing circuit 110 may include a resonant circuit, for example, in which an inductor L and a capacitor C are connected in parallel with each other. The inducing circuit 110 may function as an antenna.

The first rectifying circuit 120 rectifies an output signal (or an output voltage) of the inducing circuit 110 and provides a rectified output signal (or output voltage) to the control circuit 140 and the second rectifying circuit 160. In other words, the first rectifying circuit 120 rectifies an AC voltage corresponding to the output signal of the inducing circuit 110 to a DC voltage and provides the rectified DC voltage to the control circuit 140 and the second rectifying circuit 160.

Terminals 11 and 12 may be input terminals of the first rectifying circuit 120 and may be output terminals of the inducing circuit 110 which are respectively connected to the input terminals of the first rectifying circuit 120. A terminal 14 may be an output terminal of the first rectifying circuit 120 and may be an input terminal of the control circuit 140 which is connected to the output terminal of the first rectifying circuit 120.

The control circuit 140 controls an output voltage of the first rectifying circuit 120 in response to an output signal (or voltage) of the first rectifying circuit 120. The control circuit 140 may lower the output voltage of the first rectifying circuit 120 when the output voltage of the first rectifying circuit 120 is higher than a reference voltage (Vref). The input terminal 14 of the control circuit 140 is connected with the output terminal 14 of the first rectifying circuit 120.

The second rectifying circuit 160 rectifies and regulates the output signal of the inducing circuit 110 in response to the output signal of the first rectifying circuit 120. The second rectifying circuit 160 may simultaneously rectify and regulate the output signal of the inducing circuit 110 in response to the output signal of the first rectifying circuit 120. The second rectifying circuit 160 rectifies an AC voltage corresponding to the output signal of the inducing circuit 110 to a DC voltage in response to an output voltage corresponding to the output signal of the first rectifying circuit 120. In addition, when power exceeding what is necessary to drive the logic circuit 52 is generated by the inducing circuit 110, the second rectifying circuit 160 regulates the output voltage of the inducing circuit 110 by consuming the excessive power.

The terminals 11 and 12 may be input terminals of the second rectifying circuit 160 respectively connected with the output terminals of the inducing circuit 110. A terminal 16 may be an output terminal of the second rectifying circuit 160 connected with an input terminal 18 of the logic circuit 52.

The voltage adjusting circuit 100 may further include a regulator 180. The regulator 180 is disposed between the second rectifying circuit 160 and the logic circuit 52. The output terminal 16 of the second rectifying circuit 160 is connected with an input terminal 16 of the regulator 180. The output terminal 18 of the regulator 180 is connected with an input terminal 18 of the logic circuit 52.

The regulator 180 receives and regulates an output signal of the second rectifying circuit 160 and provides a regulated output signal to the logic circuit 52. In other words, the regulator 180 regulates the output voltage of the second rectifying circuit 160 to a driving voltage necessary to drive the logic circuit 52 and provides the driving voltage to the logic circuit 52.

The voltage adjusting circuit 100 may also include a first capacitor C1 connected between the output terminal 14 of the first rectifying circuit 120 and a potential, for example, a ground, a second capacitor C2 connected between the output terminal 16 of the second rectifying circuit 160 and a potential, for example, the ground, and a third capacitor C3 connected between the output terminal 18 of the regulator 180 and a potential, for example, the ground.

The first capacitor C1 may remove ripples from the output voltage of the first rectifying circuit 120. The second capacitor C2 may remove ripples from the output voltage of the second rectifying circuit 160. The third capacitor C3 may remove ripples from an output voltage of the regulator 180. In other words, the first through third capacitors C1 through C3 function as a low pass filter.

The first rectifying circuit 120 and the control circuit 140 may be formed as a circuit unit having the terminal 14 to output the voltage to the second rectifying circuit 160. The circuit unit may rectify and control the voltage received from the inducing circuit 110 to output the rectified and controlled voltage to the second rectifying circuit 160. Thus, the second rectifying circuit 160 may output a voltage according to the voltage received through the terminal 14 from the circuit unit and the voltage received through terminals 11 and 12 from the inducing circuit 110.

Figure 3A:
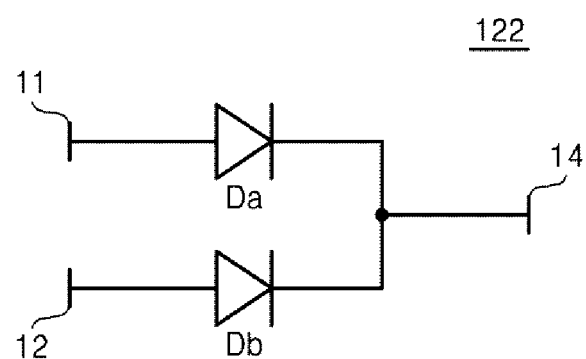
FIG. 3A is a diagram illustrating a first rectifying circuit of the voltage adjusting circuit of FIG. 2 according to an exemplary embodiment of the present general inventive concept.

FIG. 3A is a diagram illustrating a first rectifying circuit 122 usable in the voltage adjusting circuit 100 of FIG. 2 according to an exemplary embodiment of the present general inventive concept. Referring to FIGS. 2 and 3A, the first rectifying circuit 122 is an example of the first rectifying circuit 120 of FIG. 2. The first rectifying circuit 122 includes a plurality of diodes Da and Db respectively connected with the output terminals 11 and 12 of the inducing circuit 110. The plurality of diodes Da and Db rectify the output signal of the inducing circuit 110. Consequently, the first rectifying circuit 122 rectifies an AC voltage, i.e., the output voltage of the inducing circuit 110 to a DC voltage and outputs the rectified DC voltage.

Figure 3B:
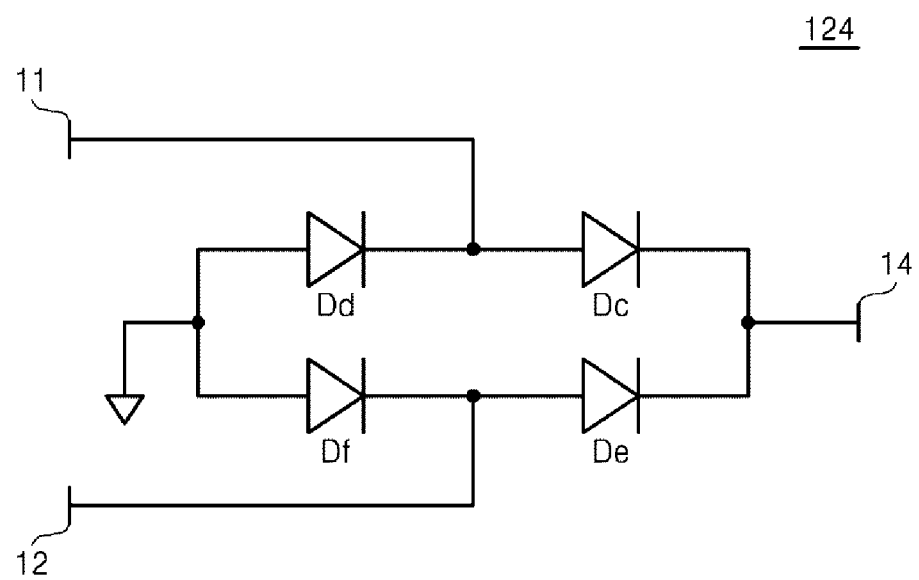
FIG. 3B is a diagram illustrating a first rectifying circuit of the voltage adjusting circuit of FIG. 2 according to an exemplary embodiment of the present general inventive concept.

FIG. 3B is a diagram illustrating a first rectifying circuit 124 usable in the voltage adjusting circuit 100 of FIG. 2 according to an exemplary embodiment of the present general inventive concept. Referring to FIGS. 2 and 3B, the first rectifying circuit 124 is an example of the first rectifying circuit 120 of FIG. 2. The first rectifying circuit 124 includes a plurality of diodes Dc and Dd connected with the output terminal 11 of the inducing circuit 110 and a plurality of diodes De and Df connected with the output terminal 12 of the inducing circuit 110. The diodes Dc, Dd, De, and Df included in the first rectifying circuit 124 rectify the output signal of the inducing circuit 110. Consequently, the first rectifying circuit 124 rectifies an AC voltage, i.e., the output voltage of the inducing circuit 110 to a DC voltage and outputs the rectified DC voltage.

Figure 4:
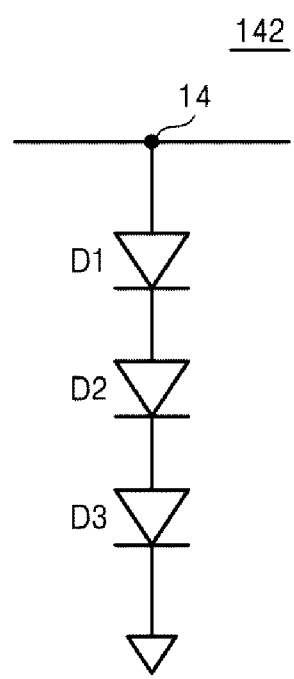
FIG. 4 is a diagram illustrating a control circuit of the voltage adjusting circuit of FIG. 2 according to an exemplary embodiment of the present general inventive concept.

FIG. 4 is a diagram illustrating a control circuit 142 usable in the voltage adjusting circuit 100 of FIG. 2 according to an exemplary embodiment of the present general inventive concept. Referring to FIGS. 2 through 4, the control circuit 142 is an example of the control circuit 140 of FIG. 2. The control circuit 142 includes at least one diode connected in series between the output terminal 14 of the first rectifying circuit 120 and a potential, for example, the ground. The control circuit 142 includes three diodes D1, D2, and D3 as illustrated in FIG. 4, but the present invention is not limited thereto. The number of diodes usable in the control circuit 142 may be determined according to a user preference or a design preference thereof.

The inducing circuit 110 induces an AC voltage from electromagnetic waves and the first rectifying circuit 120 rectifies the AC voltage to a DC voltage. The DC voltage is divided to the diodes D1, D2, and D3. The diodes D1, D2, and D3 may have the same threshold voltage. However, the threshold voltage of diodes or MOS transistors included in the first rectifying circuit 120 may not be considered in operating the first rectifying circuit 120.

When a divided voltage in each diode D1, D2, or D3 exceeds the threshold voltage of the diode D1, D2, or D3, the diode D1, D2, or D3 is turned on. When all of the diodes D1, D2, and D3 included in the control circuit 142 are turned on, the control circuit 142 forms a current path from the output terminal 14 of the first rectifying circuit 120 to the ground.

When current flows to the ground through the current path, the output voltage of the first rectifying circuit 120 decreases. The current path is formed only when the output voltage of the inducing circuit 110 or the output voltage of the first rectifying circuit 120 exceeds a reference voltage (Vref). When the output voltage of the inducing circuit 110 or the output voltage of the first rectifying circuit 120 does not exceed the reference voltage (Vref), the current path is not formed. When the current path is not formed, the output voltage of the first rectifying circuit 120 is maintained at it is.

The reference voltage (Vref) is determined based on the driving voltage of the logic circuit 52. Consequently, the reference voltage (Vref) may be the driving voltage of the logic circuit 52. When the threshold voltage of diodes or MOS transistors included in the first rectifying circuit 120 is considered, the reference voltage (Vref) may be higher than the driving voltage of the logic circuit 52.

The number of diodes included in the control circuit 142 may be determined considering the reference voltage (Vref) and the threshold voltage of a diode. Consequently, the control circuit 142 controls the output voltage of the first rectifying circuit 120 in response to the output signal, i.e. voltage of the first rectifying circuit 120.

Figure 5:
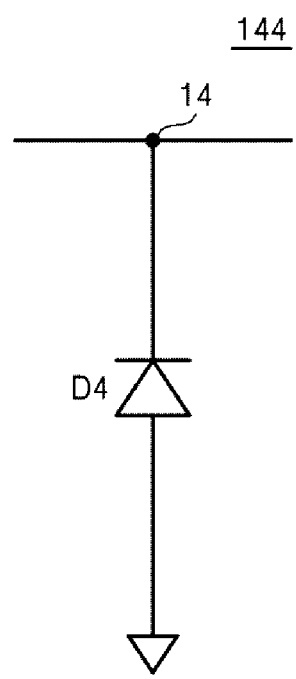
FIG. 5 is a diagram illustrating a control circuit of the voltage adjusting circuit of FIG. 2 according to an exemplary embodiment of the present general inventive concept.

FIG. 5 is a diagram illustrating a control circuit 144 usable in the voltage adjusting circuit 100 of FIG. 2 according to an exemplary embodiment of the present general inventive concept. Referring to FIGS. 2 and 5, the control circuit 144 is an example of the control circuit 140 of FIG. 2. The control circuit 144 may include a diode D4 connected backward between the output terminal 14 of the first rectifying circuit 120 and a potential, for example, the ground. The control circuit 144 includes only one diode D4 in the embodiments illustrated in FIG. 5, but the present general inventive concept is not limited thereto. The number of diodes of the control circuit may be two or more. It is possible that the diode D4 of the control circuit 144 may be a Zener diode.

The inducing circuit 110 induces an AC voltage from electromagnetic waves and the first rectifying circuit 120 rectifies the AC voltage to a DC voltage. The DC voltage is provided to the diode D4. The threshold voltage of diodes or MOS transistors included in the first rectifying circuit 120 may not be considered in operating the first rectifying circuit 120.

When the DC voltage provided to the diode D4 exceeds the breakdown voltage of the diode D4, the diode D4 is turned on. When the diode D4 included in the control circuit 144 is turned on, the control circuit 144 forms a current path from the output terminal 14 of the first rectifying circuit 120 to the ground.

When current flows to the ground through the current path, the output voltage of the first rectifying circuit 120 decreases. The current path is formed only when the output voltage of the inducing circuit 110 or the output voltage of the first rectifying circuit 120 exceeds a reference voltage (Vref). When the output voltage of the inducing circuit 110 or the output voltage of the first rectifying circuit 120 does not exceed the reference voltage (Vref), the current path is not formed. When the current path is not formed, the output voltage of the first rectifying circuit 120 is maintained at it is.

The reference voltage (Vref) is determined based on a driving voltage of the logic circuit 52. The reference voltage (Vref) may be the driving voltage of the logic circuit 52. When the threshold voltage of at least one diode or MOS transistor included in the first rectifying circuit 120 is considered, the reference voltage (Vref) may be higher than the driving voltage of the logic circuit 52.

The number of diodes included in the control circuit 144 may be determined considering the reference voltage (Vref) and the breakdown voltage of a diode. The control circuit 144 may control the output voltage of the first rectifying circuit 120 in response to the output signal, i.e. the output voltage of the first rectifying circuit 120.

Figure 6:
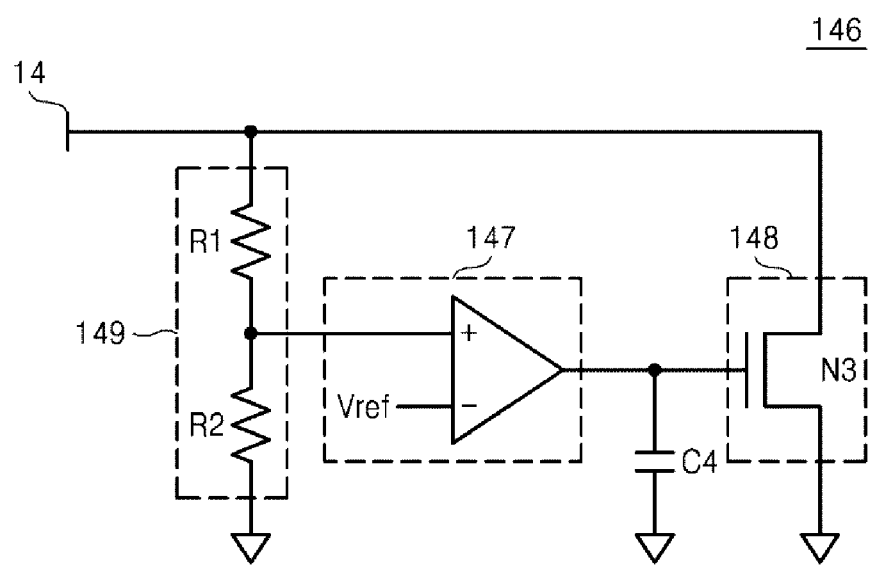
FIG. 6 is a diagram illustrating a control circuit of the voltage adjusting circuit of FIG. 2 according to an exemplary embodiment of the present general inventive concept.

FIG. 6 is a diagram illustrating a control circuit 146 usable in the voltage adjusting circuit 100 of FIG. 2 according to an exemplary embodiment of the present general inventive concept. Referring to FIGS. 2 and 6, the control circuit 146 is an example of the control circuit 140 of FIG. 2. The control circuit 146 includes a comparator 147 and a switching circuit 148. The control circuit 146 may also include a voltage divider 149 and a fourth capacitor C4.

The comparator 147 compares an input signal, i.e. the output voltage of the first rectifying circuit 120, with a reference voltage (Vref) and outputs a comparison signal. The comparator 147 receives the output voltage of the first rectifying circuit 120 or a divided voltage from the voltage divider 149. The comparator 147 compares the output voltage of the first rectifying circuit 120 or the divided voltage from the voltage divider 149 with the reference voltage (Vref) and outputs the comparison signal according to a comparison result. When the voltage input to the comparator 147 is higher than the reference voltage (Vref), the comparator 147 outputs the comparison signal to turn on the switching circuit 148. When the voltage input to the comparator 147 is lower than the reference voltage (Vref), the comparator 147 outputs the comparison signal to turn off the switching circuit 148.

The switching circuit 148 controls the output voltage of the first rectifying circuit 120 in response to the comparison signal of the comparator 147. The switching circuit 148 may be implemented by a MOS transistor N3. The MOS transistor N3 is illustrated as an N-type MOS (NMOS) transistor, but it is possible that a PMOS transistor can be used as the MOS transistor N3.

The MOS transistor N3 is connected between the output terminal 14 of the first rectifying circuit 120 and the ground. A gate of the MOS transistor N3 is connected to an output terminal of the comparator 147.

When the MOS transistor N3 is turned on in response to the comparison signal of the comparator 147, the MOS transistor N3 makes current flow from the output terminal 14 of the first rectifying circuit 120 to a potential, for example, the ground, thereby decreasing the output voltage of the first rectifying circuit 120. In other words, the MOS transistor N3 functions as a shunt. When the MOS transistor N3 is turned off in response to the comparison signal of the comparator 147, the MOS transistor N3 cuts off the current flowing from the output terminal 14 of the first rectifying circuit 120 to the ground. Since current does not flow from the output terminal 14 of the first rectifying circuit 120 to the ground, the output voltage of the first rectifying circuit 120 is maintained without dropping.

The voltage divider 149 divides the output voltage of the first rectifying circuit 120 and outputs a divided voltage as an input voltage of the comparator 147. The voltage divider 149 includes a plurality of resistors R1 and R2 connected in series between the output terminal 14 of the first rectifying circuit 120 and a potential, for example, the ground. The number of resistors included in the voltage divider 149 may be changed. The voltage divider 149 outputs the divided voltage according to a resistance ratio between the resistors R1 and R2. The fourth capacitor C4 may remove ripples from an output signal of the comparator 147. In other words, the fourth capacitor C4 functions as a low pass filter. The operations of the control circuit 146 will be described below.

The inducing circuit 110 induces an AC voltage from electromagnetic waves and the first rectifying circuit 120 rectifies the AC voltage to a DC voltage. The DC voltage or the divided voltage of the voltage divider 149 is provided to the comparator 147. The threshold voltage of at least one diode or MOS transistor included in the first rectifying circuit 120 may not be considered in operating the first rectifying circuit 120.

When the voltage input to the comparator 147 exceeds the reference voltage (Vref), the comparator 147 outputs the comparison signal to turn on the switching circuit 148. When the switching circuit 148 is turned on, current flows from the output terminal 14 of the first rectifying circuit 120 to the ground, and therefore, the output voltage of the first rectifying circuit 120 drops.

When the voltage input to the comparator 147 does not exceed the reference voltage (Vref), the comparator 147 outputs the comparison signal to turn off the switching circuit 148. When the switching circuit 148 is turned off, current does not flow from the output terminal 14 of the first rectifying circuit 120 to the ground, and therefore, the output voltage of the first rectifying circuit 120 does not drop down to the potential.

The reference voltage (Vref) is determined based on the driving voltage of the logic circuit 52. Consequently, the reference voltage (Vref) may be the driving voltage of the logic circuit 52. When the threshold voltage of at least one diode or MOS transistor included in the first rectifying circuit 120 is considered, the reference voltage (Vref) may be higher than the driving voltage of the logic circuit 52. In addition, since the output voltage of the first rectifying circuit 120 is divided by the voltage divider 149, the reference voltage (Vref) may be lower than the driving voltage.

Figure 7:
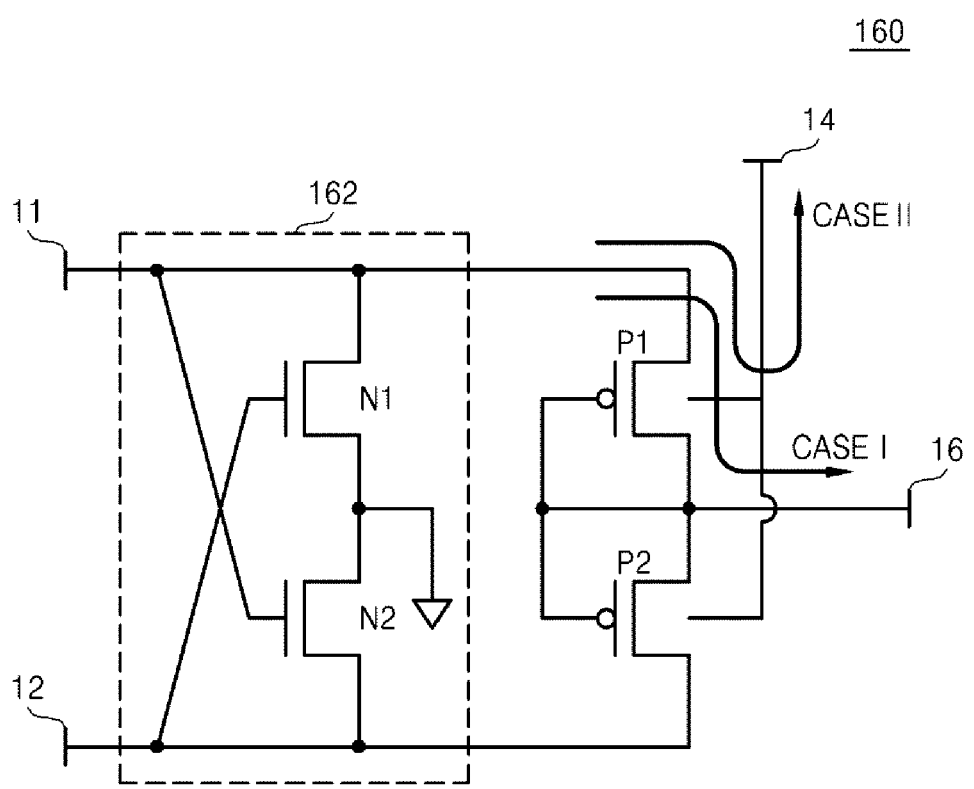
FIG. 7 is a circuit diagram illustrating a second rectifying circuit of the voltage adjusting circuit of FIG. 2 according to an exemplary embodiment of the present general inventive concept

FIG. 7 is a circuit diagram illustrating the second rectifying circuit 160 of FIG. 2. Referring to FIGS. 2 and 7, the second rectifying circuit 160 includes a plurality of diode-connected PMOS transistors P1 and P2 connected in series with each other. A bulk B of each of the PMOS transistors P1 and P2 is connected with the output terminal 14 of the first rectifying circuit 120.

The PMOS transistors P1 and P2 rectify and regulate the output signal of the inducing circuit 110 in response to the output signal of the first rectifying circuit 120. The PMOS transistors P1 and P2 may simultaneously rectify and regulate the output signal of the inducing circuit 110 in response to the output signal of the first rectifying circuit 120. A reference voltage (Vref) is determined based on the driving voltage of the logic circuit 52. The reference voltage (Vref) may be the same as the driving voltage.

The second rectifying circuit 160 may further include a current return circuit 162. The current return circuit 162 forms a current loop in response to the output voltage, i.e., the AC voltage of the inductive circuit 110.

The current return circuit 162 includes NMOS transistors N1 and N2 connected in series between the output terminals 11 and 12 of the inducing circuit 110. A common node of the NMOS transistors N1 and N2 is connected to a potential, for example, the ground. A gate of the NMOS transistor N1 having a terminal connected with a first output terminal (e.g., 11) among the output terminals 11 and 12 of the inducing circuit 110 is connected with a second output terminal (e.g., 12) among the output terminals 11 and 12 of the inducing circuit 110. A gate of the NMOS transistor N2 having a terminal connected with the second output terminal (i.e., 12) among the output terminals 11 and 12 of the inducing circuit 110 is connected with the first output terminal (i.e., 11) among the output terminals 11 and 12 of the inducing circuit 110.

When a positive voltage is induced at the output terminal 11 of the inducing circuit 110, that is, when a negative voltage is induced at the output terminal 12 of the inducing circuit 110, the NMOS transistor N1 is turned off and the NMOS transistor N2 is turned on. As a result, current flowing in the output terminal 11 of the inducing circuit 110 is provided to the PMOS transistor P1 and current flowing in the output terminal 12 of the inducing circuit 110 is provided to the ground.

When a negative voltage is induced at the output terminal 11 of the inducing circuit 110, that is, when a positive voltage is induced at the output terminal 12 of the inducing circuit 110, the current return circuit 162 operates in opposite manner.

Figure 8:
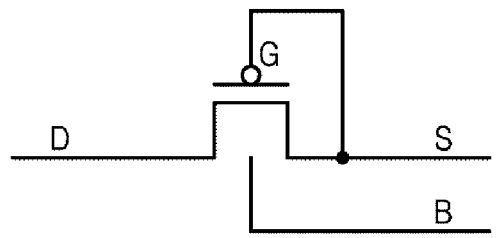
FIG. 8 is a diagram illustrating a P-type metal oxide semiconductor (PMOS) transistor of the second rectifying circuit of FIG. 7 according to an exemplary embodiment of the present general inventive concept.
Figure 9:
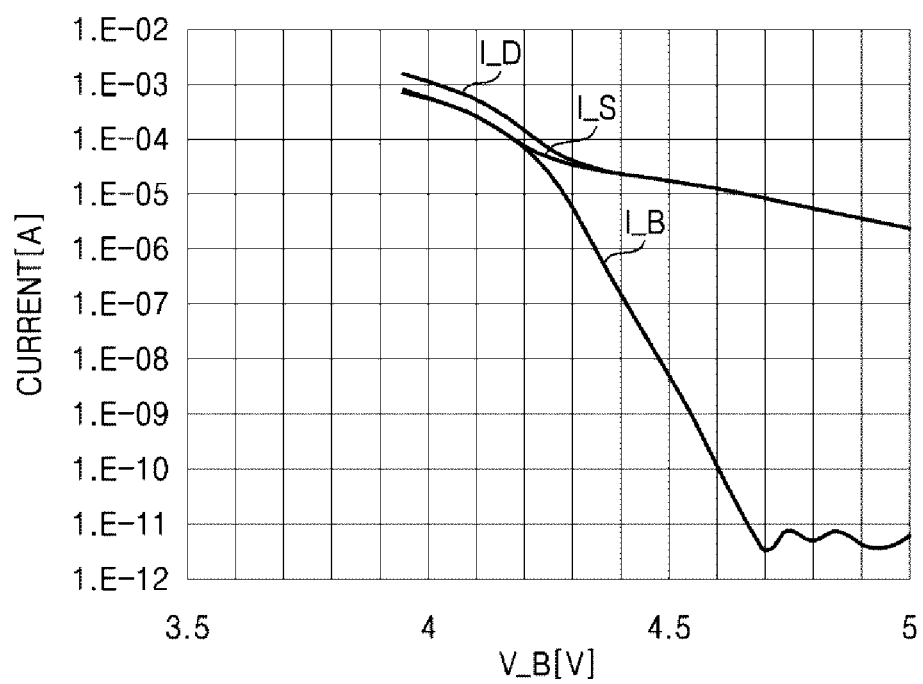
FIG. 9 is a graph illustrating current characteristic curves with respect to a bulk voltage of the PMOS transistor of FIG. 8.

FIG. 8 is a diagram illustrating the PMOS transistor P1 of FIG. 7. FIG. 9 is a graph illustrating current characteristic curves with respect to a bulk voltage V_B of the bulk B of the PMOS transistor P1 of FIG. 8. The characteristics of the PMOS transistor P1 will be described with reference to FIGS. 8 and 9. A gate G of the PMOS transistor P1 is connected to a source S of the PMOS transistor P1, so that the PMOS transistor P1 may function as a diode.

FIG. 9 illustrates the changes in a current flowing in drain D, source S, and bulk B of the PMOS transistor P1 when a voltage is swept on the bulk B of the PMOS transistor P1 after a voltage of 5 V is applied to the drain D of the PMOS transistor P1 and a voltage of 4.3 V is applied to the source S of the PMOS transistor P1. When the bulk voltage V_B is lower than 4.3 V, a source current I_S is similar to a bulk current I_B, that is, a drain current I_D flows to both of the source S and the bulk B.

When the bulk voltage V_B is higher than 4.3 V, the bulk current I_B decreases and the source current I_S is similar to the drain current I_D, that is, the drain current I_D mostly flows to the source S and rarely flows to the bulk B.

The above-described characteristics of the PMOS transistor P1 are caused by a voltage difference between the source S and the bulk B. The threshold voltage of a MOS transistor is determined not only by an intrinsic threshold voltage but by a voltage difference between source and bulk. Accordingly, the threshold voltage of the MOS transistor increases. As a result, when an AC voltage is rectified to a DC voltage, efficiency decreases.

However, the present general inventive concept may use the above-described characteristics of a PMOS transistor, thereby providing the voltage adjusting circuit 100 that rectifies and regulates the output signal of the inducing circuit 110 at a time. In addition, the PMOS transistor has a small voltage difference between bulk and source, and therefore, it is easy to control the operation of the PMOS transistor by adjusting a bulk voltage.

The operations of the second rectifying circuit 160 will be described in detail with reference to FIGS. 2 and 7. When a positive AC voltage output to the output terminal 11 of the inducing circuit 110 exceeds the reference voltage (Vref), the control circuit 140 decreases the output voltage of the first rectifying circuit 120. When the decreased output voltage is provided to the bulk of the PMOS transistor P1, the PMOS transistor P1 rectifies and regulates the AC voltage at a time.

A current provided to the PMOS transistor P1 may flow to the output terminal 16 of the second rectifying circuit 160 in a CASE I and also may flow to the bulk of the PMOS transistor P1 in a CASE II. The current flowing to the bulk is generated by an excessive portion of the AC voltage exceeding the reference voltage (Vref) because the decreased output voltage is provided to the bulk and the bulk voltage is lower than the source voltage in the PMOS transistor P1. Therefore, the second rectifying circuit 160 simultaneously rectifies and regulates the AC voltage.

When a positive AC voltage output to the output terminal 11 of the inducing circuit 110 does not exceed the reference voltage (Vref), the control circuit 140 does not decrease the output voltage of the first rectifying circuit 120. Accordingly, the output voltage of the first rectifying circuit 120, which has the same value as the AC voltage, is provided to the bulk B of the PMOS transistor P1. At this time, since the bulk voltage is the same as the AC voltage, a difference between the bulk voltage and the source voltage does not exist or is ignorable. Accordingly, the current flowing to the PMOS transistor P1 does not flow to the bulk of the PMOS transistor P1 or the current flowing to the bulk of the PMOS transistor P1 is ignorable. Consequently, the second rectifying circuit 160 rectifies the AC voltage. When a negative AC voltage is output to the output terminal 11 of the inducing circuit 110, the PMOS transistor P2 operates in the same manner as described above.

FIG. 10 is a flowchart illustrating a method of operating a voltage adjusting circuit according to an exemplary embodiment of the present general inventive concept. The method includes inducing an AC voltage from electromagnetic waves using an inducing circuit (e.g., 110 of FIG. 2) in operation S100 and rectifying and regulating the AC voltage at a time using a diode-connected PMOS transistor when the AC voltage exceeds a reference voltage (Vref) in operation S140.

The method may further include comparing the AC voltage with the reference voltage (Vref) in operation S120 to simultaneously rectifying and regulating the AC voltage.

In simultaneously rectifying and regulating the AC voltage in operation S140, a current generated by an excessive portion of the AC voltage exceeding the reference voltage (Vref) may be made to flow to a bulk of the diode-connected PMOS transistor to regulate the AC voltage.

Alternatively, the operation S140 of simultaneously rectifying and regulating the AC voltage may comprises rectifying the AC voltage using a rectifying circuit, decreasing an output voltage of the rectifying circuit by forming a current path from an output terminal of the rectifying circuit to the ground using a control circuit, and providing the decreased output voltage to a bulk of the diode-connected PMOS transistor.

In decreasing the output voltage of the rectifying circuit, the current path may be formed when the output voltage of the rectifying circuit exceeds a threshold voltage of at least one diode (e.g., D1, D2, and/or D3 of FIG. 4) connected in series between the output terminal of the rectifying circuit and the ground.

As an alternative, in decreasing the output voltage of the rectifying circuit, the current path may be formed when the output voltage of the rectifying circuit exceeds a breakdown voltage of a diode (e.g., D4 of FIG. 5) connected backward between the output terminal of the rectifying circuit and the ground. Alternatively, the decreasing the output voltage of the rectifying circuit may comprises outputting a comparison signal as a result of comparing the output voltage of the rectifying circuit with the reference voltage (Vref), and decreasing the output voltage of the rectifying circuit by forming the current path from the output terminal of the rectifying circuit to the ground when the output voltage of the rectifying circuit exceeds the reference voltage (Vref) in response to the comparison signal.

The method may further include regulating the output voltage of the diode-connected PMOS transistor using a regulator and providing a regulated output voltage to a logic circuit.

FIG. 11 is a flowchart illustrating a method of operating a contactless card according to an exemplary embodiment of the present general inventive concept. The method includes inducing an AC voltage from electromagnetic waves using an inducing circuit in operation S200, outputting a DC voltage by rectifying and regulating the AC voltage at a time using a diode-connected PMOS transistor when the AC voltage exceeds a reference voltage (Vref) in operation S240, and communicating with a card reader using the DC voltage as a driving voltage in operation S260.

The method may further include comparing the AC voltage with the reference voltage (Vref) in operation S220 to simultaneously rectifying and regulating the AC voltage. In outputting the DC voltage in operation S240, a current generated by an excessive portion of the AC voltage exceeding the reference voltage (Vref) may be made to flow to a bulk of the diode-connected PMOS transistor to regulate the AC voltage.

Alternatively, the operation S240 of outputting the DC voltage may also comprise rectifying the AC voltage using a rectifying circuit, decreasing an output voltage of the rectifying circuit by forming a current path from an output terminal of the rectifying circuit to the ground using a control circuit, and providing the decreased output voltage to a bulk of the diode-connected PMOS transistor.

As described above, according to an embodiment of the present general inventive concept, a voltage adjusting circuit consumes an excessive portion of power exceeding what is needed to drive a contactless card, thereby preventing excessive power from being provided to an internal logic circuit. As a result, the voltage adjusting circuit prevents malfunction and breakdown of the contactless card. In addition, the voltage adjusting circuit adjusts the bulk voltage of a diode-connected PMOS transistor, thereby simultaneously rectifying and regulating an induced voltage.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A voltage adjusting circuit comprising:
an inducing circuit configured to induce a voltage from electromagnetic waves;
a first rectifying circuit configured to rectify an output voltage of the inducing circuit;
a control circuit configured to control an output voltage of the first rectifying circuit in response to the output voltage of the first rectifying circuit; and
a second rectifying circuit configured to simultaneously rectify and regulate the output voltage of the inducing circuit in response to the output voltage of the first rectifying circuit wherein the second rectifying circuit comprises a plurality of diode-connected P-type metal oxide semiconductor (PMOS) transistors connected in series with each other, and a bulk of each of the PMOS transistors is connected with an output terminal of the first rectifying circuit.

2. The voltage adjusting circuit of claim 1, wherein the control circuit comprises at least one diode connected in series between the output terminal of the first rectifying circuit and a ground.

3. The voltage adjusting circuit of claim 1, wherein the control circuit comprises a diode backward connected between the output terminal of the first rectifying circuit and a ground.

4. The voltage adjusting circuit of claim 1, wherein the control circuit comprises:
a comparator configured to compare the output voltage of the first rectifying circuit with a reference voltage; and
a switching circuit configured to control the output voltage of the first rectifying circuit in response to an output signal of the comparator.

5. The voltage adjusting circuit of claim 4, wherein the control circuit further comprises a voltage divider connected between the output terminal of the first rectifying circuit and an input terminal of the comparator.

6. The voltage adjusting circuit of claim 4, wherein the switching circuit is a MOS transistor functioning as a shunt.

7. A contactless card comprising:
the voltage adjusting circuit of claim 1; and
a logic circuit configured to receive a direct current (DC) voltage from the voltage adjusting circuit and process data received or transmitted through the inducing circuit.

8. A contactless card system comprising:
the contactless card of claim 7; and
a card reader configured to supply power to the contactless card using a radio system and communicate with the contactless card.

9. A method of operating a voltage adjusting circuit, the method comprising: inducing an alternating current (AC) voltage from electromagnetic waves using an inducing circuit; and simultaneously rectifying and regulating the AC voltage using a diode-connected P-type metal oxide semiconductor (PMOS) transistor when the AC voltage is higher than a reference voltage; wherein the simultaneously rectifying and regulating the AC voltage comprises regulating the AC voltage by flowing a current generated by an excessive portion of the AC voltage exceeding the reference voltage to a bulk of the diode-connected PMOS transistor.

10. A method of operating a voltage adjusting circuit, the method comprising: inducing an alternating current (AC) voltage from electromagnetic waves using an inducing circuit; and simultaneously rectifying and regulating the AC voltage using a diode-connected P-type metal oxide semiconductor (PMOS) transistor when the AC voltage is higher than a reference voltage; wherein the simultaneously rectifying and regulating the AC voltage comprises: rectifying the AC voltage using a rectifying circuit; decreasing an output voltage of the rectifying circuit by forming a current path from an output terminal of the rectifying circuit to a ground using a control circuit; and providing a decreased output voltage to a bulk of the diode connected PMOS transistor.

11. The method of claim 10, wherein the decreasing the output voltage of the rectifying circuit comprises forming the current path when the output voltage of the rectifying circuit exceeds a threshold voltage of at least one diode connected in series between the output terminal of the rectifying circuit and the ground.

12. The method of claim 10, wherein the decreasing the output voltage of the rectifying circuit comprises forming the current path when the output voltage of the rectifying circuit exceeds a breakdown voltage of a diode backward connected between the output terminal of the rectifying circuit and the ground.

13. The method of claim 10, wherein the decreasing the output voltage of the rectifying circuit comprises:
   comparing the output voltage of the rectifying circuit with a reference voltage and outputting a comparison signal; and
   forming the current path from the output terminal of the rectifying circuit to the ground in response to the comparison signal when the output voltage of the rectifying circuit exceeds the reference voltage.

14. A voltage adjusting circuit usable with a contactless card, comprising:
   an inducing circuit configured to receive a radio signal, and having one or more terminals to output a first voltage signal according to the received radio signal;
   a circuit unit connected to the terminals of the inducing circuit to rectify and control the voltage signal of the inducing circuit, and having another terminal to generate a second voltage signal; and
   a second circuit unit connected to the terminals of the inducing circuit to receive the first voltage signal and connected to the another terminal to receive the second voltage signals, and to rectify and regulate the first voltage signal according to the second voltage signal to generate a third voltage signal wherein the second circuit unit comprises a plurality of diode-connected P-type metal oxide semiconductor (PMOS) transistor connected in series with each other, and a bulk of each of the PMOS transistors receives the second voltage signal.

15. The voltage adjusting circuit of claim 14, wherein the contactless card comprises a logic circuit connected to the second circuit unit to receive the third voltage signal.

16. The voltage adjusting circuit of claim 14, wherein the first voltage signal is variable, the second voltage signal is variable, and the third voltage signal is constant.

* * * * *